United States Patent [19]

Schlag et al.

[11] Patent Number: 5,062,935

[45] Date of Patent: Nov. 5, 1991

[54] METHOD OF VAPORIZING A SAMPLE SUBSTANCE

[75] Inventors: Edward W. Schlag, Garching; Josef Lindner, Munich; Ronald C. Beavis, Landshut; Jürgen Grotemeyer, Freising, all of Fed. Rep. of Germany

[73] Assignee: Bruker-Franzen Analytik GmbH, Bremen, Fed. Rep. of Germany

[21] Appl. No.: 326,763

[22] Filed: Mar. 21, 1989

[30] Foreign Application Priority Data

Mar. 22, 1988 [DE] Fed. Rep. of Germany ....... 3809504

[51] Int. Cl.[5] ....................... G01N 27/62; B23K 26/00

[52] U.S. Cl. .......................... 204/157.41; 204/157.61; 250/425; 250/492.1

[58] Field of Search ....................... 204/157.15, 157.41, 204/157.61; 250/425, 492.1

[56] References Cited

U.S. PATENT DOCUMENTS

| | | | |
|---|---|---|---|
| 4,091,265 | 5/1978 | Friichtenicht | 219/121 L |
| 4,259,572 | 3/1981 | Brunnee et al. | 250/281 |
| 4,728,796 | 3/1988 | Brown | 250/425 X |

FOREIGN PATENT DOCUMENTS

DE-A-3018455 of 0000 Fed. Rep. of Germany .

OTHER PUBLICATIONS

Z. Naturforsch, 37a (1982), 9-14.
Analytical Chemistry 55 (1983), 1302-1305.
Biomedical Mass Spectrometry, vol. 12, No. 4 (1985), 159-162.
Analytical Chemistry 57 (1985), 2935-2939.
Analytical Chemistry, 50, No. 7, 19 Jun. 1978, pp. 985-991.
Trends in Analytical Chemistry 6, No. 4, Apr. 1987, pp. 78-81.
Analytical Chemistry, 53, No. 1, Jan. 1981, pp. 109-113.
Dissertation by Reiner Stoll, University of Bonn, 1982.
International Journal of Mass Spectrometry and Ion Processes, 78 (1987), 53-68.

*Primary Examiner*—John F. Niebling
*Assistant Examiner*—Ben C. Hsing
*Attorney, Agent, or Firm*—Cohn, Powell & Hind

[57] ABSTRACT

When vaporizing a sample substance consisting of big molecules, in particular for the purpose of mass-spectroscopic examinations, the energy introduced for the vaporization process may lead to thermolytic decomposition of the sample substance. In order to prevent such decomposition, the invention proposes that the sample substance be mixed, prior to its irradiation, with a matrix material which is easily decomposed under the influence of the laser beam pulses. The matrix may consist of a material which absorbs the radiation and which is easily decomposed thermolytically, or else of a material which is permeable to laser radiation, but mixed with a metal powder. When the mixture is exposed to laser beam pulses, the instable matrix material will decompose first whereby the embedded molecules of the sample substance are set free. It is possible in this manner to prevent, practically completely, the molecules of the sample substance from being destructed. Suitable compounds for use as matrix material are, in particular, sugar, cellulose and $NH_4NO_3$ as well as polyethylene, with an admixture of gold or silver powder.

20 Claims, 6 Drawing Sheets

METHOD OF VAPORIZING A SAMPLE SUBSTANCE

BACKGROUND AND SUMMARY OF THE INVENTION

The present invention relates to a method of vaporizing a sample substance consisting of big molecules, wherein the sample substance is exposed to high-energy laser beam pulses so that the molecules at the surface of the sample substance are desorbed by the energy of the laser beam pulses.

It is a necessity in mass-spectroscopic examination processes to reduce solid sample substances to a gaseous state. This reduction is connected with considerable difficulties in cases where the sample substance consists of very big molecules which tend to be easily decomposed by the introduction of the energy required for vaporizing them. DE-OS 32 24 801 describes a method of vaporizing a sample substance consisting of big molecules wherein the sample substance is exposed to laser beam pulses whose energy and duration is adjusted in such a manner that the sample substance is vaporized before it can decompose. The neutral molecules produced during this process are admixed to a beam of carrier gas which is cooled adiabatically by expansion. By introducing the neutral molecules into that area of the beam where the latter starts to expand, and by maintaining this area at a temperature substantially lower than the decomposition temperature of the sample substance, the molecules of the sample substance are cooled effectively so that they are prevented from decomposing. The ionization of the molecules of the sample, which is necessary for mass-spectroscopic examination, is effected in the beam of the carrier gas, at a later point in time.

Although the known method can be applied with success for many substances, mass-spectroscopic examinations of such substances have shown that the spectrum comprises certain lines which may be regarded as decomposition products of the sample substance. Thorough investigations have shown that these decomposition products occur during vaporization of the sample substance, rather than during the subsequent ionization process. While these decomposition products do not prevent the sample substance from being determined by the spectroscopic process, they lead to a reduced yield of intact molecules and to disturbing lines in the spectrum.

Now, it is the object of the present invention to provide a method for vaporizing big molecules where the risk that the molecules may be decomposed by the energy introduced for the vaporization process is considerably reduced, or even fully excluded.

This object is achieved according to the invention by the steps of mixing the sample substance, prior to its irradiation, with a matrix material which is easily decomposed under the influence of the laser beam pulses, and exposing the mixture comprising the sample substance and the matrix material to the laser beam pulses.

Due to the fact that the sample substance is embedded in a matrix material which is easily decomposed, the energy introduced through the laser beam pulses is distributed between the sample substance and the matrix material and is consumed in the first line for the purpose of decomposing the matrix. This decomposition of the matrix material into gas molecules leads to a highly effective destruction of the material in the environment of the sample molecules which are embedded in the matrix substance, with the result that the sample molecules lose their connection to the surface and, accordingly, to other molecules and are flung away from the surface of the sample substance, a process which might also be described as a "local explosion". Consequently, the method according to the invention causes the delicate molecules of the sample substance to be detached from the sample surface without being exposed to very high energy. At the same time, the decomposition of the matrix material leads to what may be described as a "natural jet" which is directed away from the sample surface and whose gas particles have the effect of pre-cooling the desorbed sample molecules effectively before they reach, for example, an ultrasonic beam where they are cooled down further in the manner described before.

A variant of the method according to the invention provides that the matrix material used is one consisting of at least one compound which is easily decomposed thermolytically into gas molecules. In order to protect the sample substance effectively, it is advantageous in this case if the mixture employed is one where the number of molecules of the matrix material is greater than the number of molecules of the sample substance. The proportion of the sample substance may in this case be in the order of 10 to 40 percent by weight, depending on the type of sample substance on the one hand and the type of compound used as matrix material, on the other hand.

The method according to the invention is particularly effective when the matrix material used comprises at least one compound which absorbs light having the wavelength of the laser beam pulses. This ensures particularly efficiently that the greatest part of the energy introduced by the laser beam pulses is actually absorbed by the matrix material and that the molecules of the sample substance are set free by the compounds of the matrix material decomposing into gas molecules in their neighborhood.

The condition mentioned above, namely that the compounds forming the matrix material should be easily decomposed into gas molecules, is fulfilled by both, organic and inorganic compounds. Of the group of organic compounds, sugar, in particular pentose or hexose, but also polysaccharides such as cellulose, are particularly well suited. These compounds are decomposed thermolytically into $CO_2$ and $H_2O$ so that no residues are formed which might lead to chemical reactions. Of the group of inorganic compounds, nitrate of ammonium should be mentioned which is decomposed practically without leaving any residues.

According to another variant of the method according to the invention, a metal powder, preferably gold or silver powder having a grain size of less than 40 $\mu$m, is embedded into the matrix material. It is possible in this case to use matrix materials which are not decomposed thermolytically by absorption of the laser radiation. Although this theory has not been proven definitely, it can be assumed that plasma waves are encountered at the surface of the metal particles which propagate as shock waves and cause the matrix to burst at its surface whereby the molecules embedded in the matrix are set free. It has been found that the use of a polyethylene as a matrix material is particularly advantageous for this variant of the invention. The use of polyethylene provides the particular advantage that this material has been used before as matrix material in infrared spectroscopy so that well-proven materials and equipment are already available for embedding the sample substance in such a polyethylene.

For example, the matrix material and the sample substance may be formed into pellets which may then be exposed to the laser beam pulses.

The method according to the invention has been employed for vaporizing organic compounds whose chemical composition varies within very broad limits. It has been found that the method can be used without any difficulties for molecules having highly polar groups, and for homopolar molecules as well. The first group includes compounds of an acidic and/or basic character, such as peptides, amino acids and dyes, while aromatic and non-aromatic hydrocarbons count among the latter group. It has been found to be a particular advantage that, compared with the method of vaporizing the sample without mixing the latter with a matrix material, the total yield of desorbed sample molecules could be increased by a factor of 4 to 10, depending on the nature of the sample substance.

A particularly preferred embodiment of the method according to the invention provides that pellets are produced from a spectroscopic polyethylene which is permeable to radiation of a wavelength of about 10 μm, with a portion of approximately $10^{-1}$ to $10^{-2}$ parts by weight of the sample substance and approximately $10^{-1}$ to $10^{-2}$ parts by weight of gold or silver powder, and that the pellets are then exposed to the radiation of a $CO_2$ laser. It has become possible in this manner not only to increase substantially the sensitivity of the method according to the invention, but also to extend the possibilities of mass spectroscopy to such molecules which heretofore seemed to be unsuited for mass-spectroscopic examination, such as nucleotides.

The invention will now be described and explained in more detail by way of a number of examples the results of which are illustrated in the diagrams of FIGS. 1 to 9 of the drawings.

DESCRIPTION OF THE PREFERRED EMBODIMENTS

In the case of the examples illustrated in FIGS. 1 to 4, the method according to the invention was carried out by irradiating a sample placed on a sample carrier located a few millimeters below a nozzle emitting an ultrasonic beam, with an IR laser beam pulse having an energy of 50 mJ and a duration of 20 μs. The ultrasonic gas beam was switched on after every IR laser beam pulse so that the gaseous products produced by the laser beam pulse were entrained by the ultrasonic gas beam and cooled as the gas beam expanded. The gas beam was then guided through means for removing any cations so that a subsequent ionization area, where a UV laser beam intersected the gas beam, was entered only by neutral molecules. The UV laser generated laser beam pulses of a duration of 5 ns and an energy of 300 μJ. The cations generated in this manner were introduced into a time-of-flight mass spectrometer and detected by a multi-channel plate arrangement. The time-of-flight mass spectrometer used was of the type described by Anal. Instrum., 16, 151 (1986). The typical mass resolution of this instrument is in the range of 6000 to 10000, according to the FWHM definition.

The sample substances examined by the set-up described above were dipeptides. Approximately 1 mg of the peptide was suspended in 50 μl of water, and 20 μl of this suspension were then put on the sample carrier. For most of the spectra obtained, approximately 10% of the substance placed on the sample carrier was consumed for producing the spectrum.

Similarly, mixtures of dipeptides and matrix materials were produced. 1 mg of the peptide was suspended in an aqueous solution of the desired matrix compound, whereafter 20 ml of the resulting suspension were put on the sample carrier. In both cases, the water was removed simply by letting the substance dry at ambient air conditions. The matrix compounds used were sucrose and glucose; the water used was tripledeionized.

Figure 1:
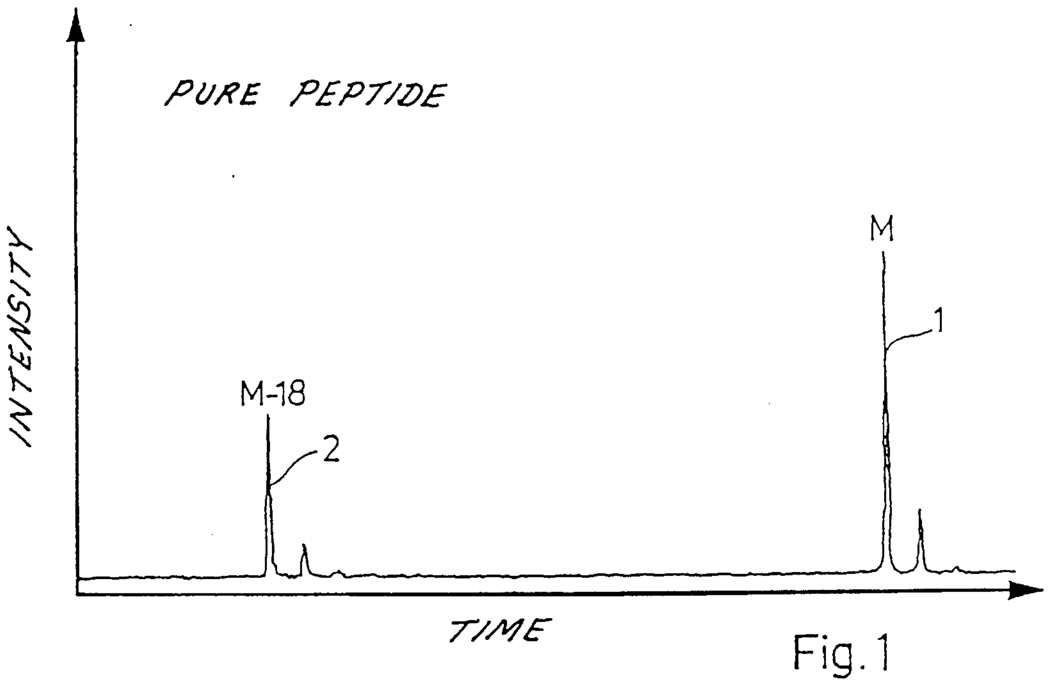
FIG. 1 shows the mass spectrum for leucine tryptophane.
Figure 2:
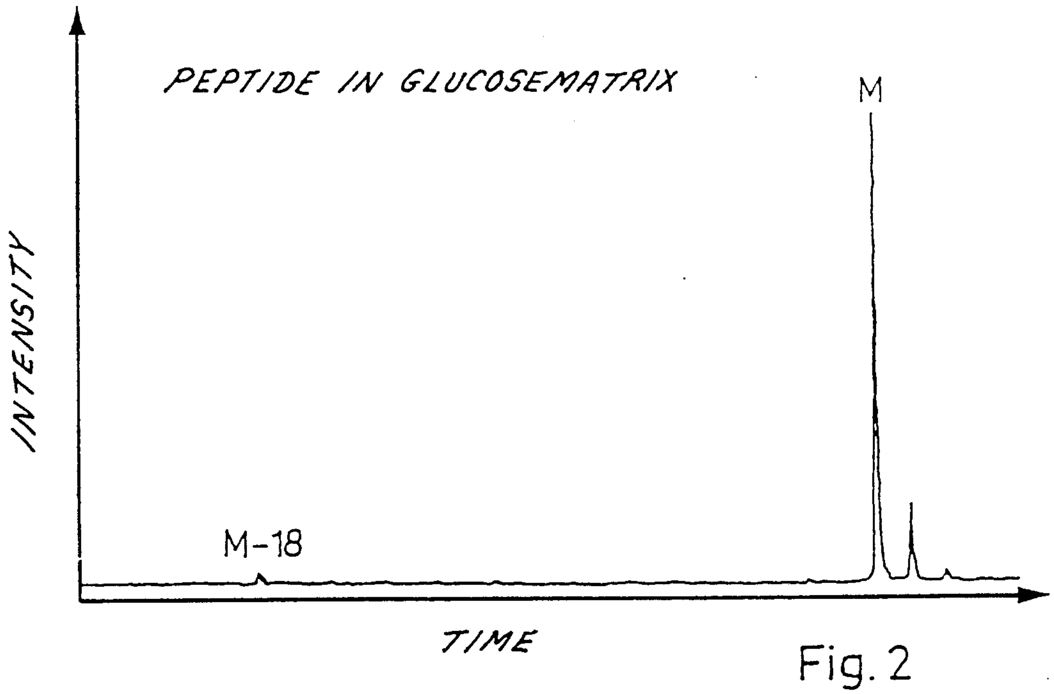
FIG. 2 shows the mass spectrum for the substance of FIG. 1 embedded in a glucose matrix.
Figure 3:
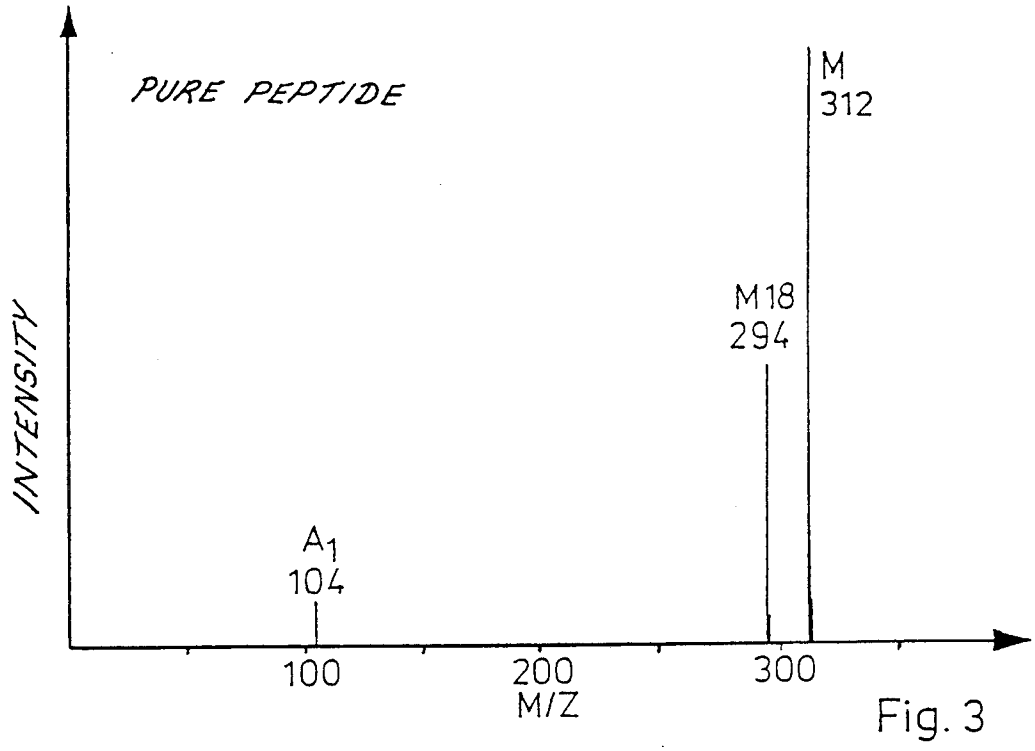
FIG. 3 shows the mass spectrum for methionine tyrosine.
Figure 4:
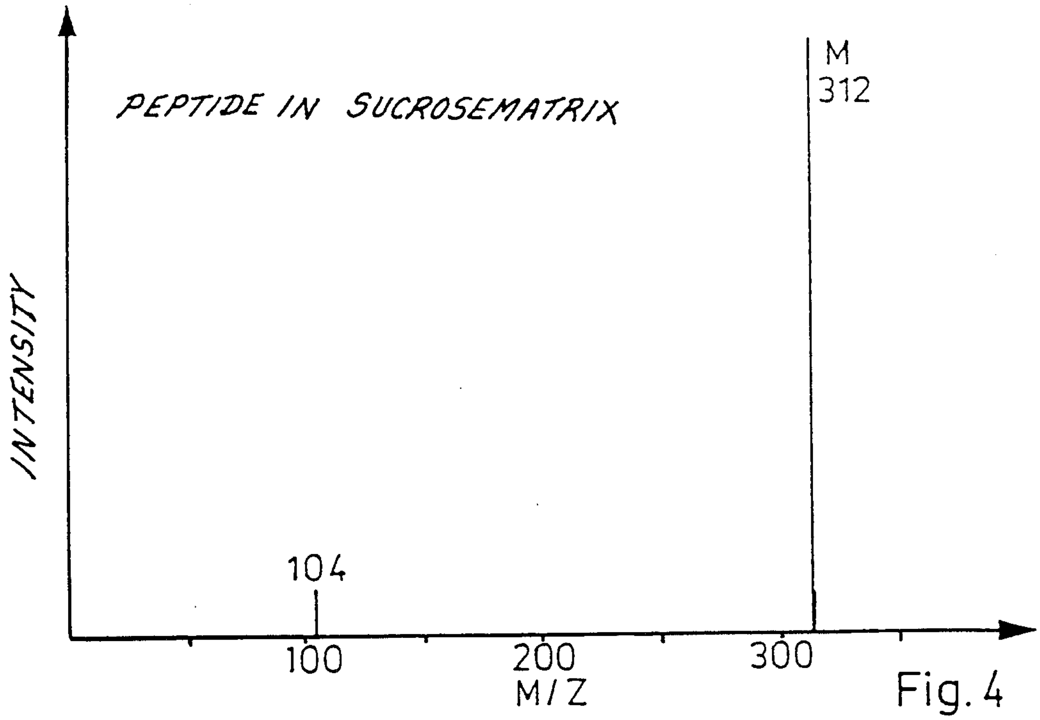
FIG. 4 shows the mass spectrum for the substance of FIG. 3 embedded in a sucrose matrix.

FIG. 1 shows the mass spectrum obtained in this manner for leucine tryptophane, a pure peptide. In addition to the line 1 for the pure peptide with the mass M resulting from the time of flight plotted against the abscissa, one can see in the spectrum another line 2 of a substance having the mass M-18. FIG. 2 shows the spectrum of the same peptide leucine tryptophane but after the peptide has been embedded in a glucose matrix, at a ratio of 1 mg glucose per 1 mg peptide. Mixing the peptide with the glucose leads to almost complete suppression of the M-18 line, which is the result of the destruction of parts of the peptide molecules during the vaporization process.

Similarly to FIGS. 1 and 2, FIGS. 3 and 4 show the spectrum of a pure peptide and a peptide embedded in a sucrose matrix. The peptide used for these examples was methionine tyrosine. This time, the mass-to-charge ratio M/Z has been plotted against the abscissa of the diagrams of FIGS. 3 and 4, whereas the coordinate is again representative of the line intensity. Ionization of the substance led only to the $A_1$ fragment with M/Z=104, the term A fragment being taken from the Roepstroff-Fohlman nomenclature (Biodmed. Mass Spectrom. 11.601 (1984)).

As in the test illustrated by FIGS. 1 and 2, the vaporization of the pure peptide leads to fragmentation of the peptide, and as a result thereof the line with the mass number M-18 is obtained. In contrast, this line disappears completely—as appears from FIG. 4—when the peptide is embedded in a sucrose matrix. It will be easily appreciated that the $A_1$ fragment obtained after vaporization of the peptide molecules, during ionization, will remain also when vaporizing the peptide in a sucrose matrix.

It should be mentioned in this connection that the samples that led to the spectra described above had a somewhat blackened aspect as a result of the pyrolysis of the sugar matrix, due to the repeated laser beam pulses. Such blackening did not occur in the case of samples containing the pure peptides. It may be assumed that the decomposition of the sugars prevents the pyrolytic dehydration of the peptides because the pyrolysis of the sugar leads to an excess of water in the neighborhood of the peptide molecules whereby the dehydration reaction of the peptides is forced into the other direction.

Unless otherwise stated, pellets were produced for the examples illustrated in FIGS. 5 to 9 from 5 mg of polyethylene powder, approximately 0.1 mg of silver or gold powder and the stated quantity of the sample substance. The pellets were then exposed to the radiation of a keyed TEA laser having a wavelength of 10.6 μm and a pulse power of 10 mJ. The pulse generated by the laser was of the bimodal type and had a short, sharp peak of a duration of 2 μs (i.e. FWHM=2 μs) and a broad trailing edge of a duration of 20 μs (i.e. FWHM=20 μs). The intensity of the trailing edge was equal to only half the intensity of the sharp peak. The molecules of the sample substance which were desorbed by the laser beam pulses got into a gas beam produced by an ultrasonic jet arranged at a distance of 1 to 2 mm from the point of desorption. The dynamic pressure of the beam was equal to 1 to 2 bar. The molecules of the sample substance spread over the gas beam after a flight of 80 mm in the direction of the ionization area. The mass spectrometer used was the same as the one used for the preceding examples.

Figure 5:
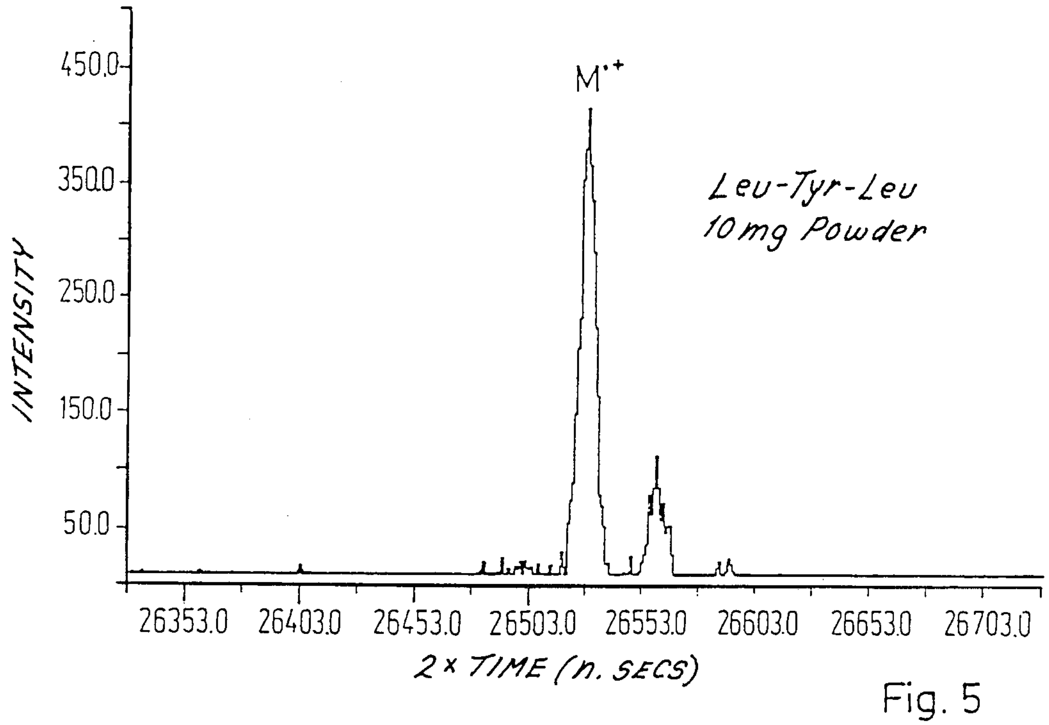
FIG. 5 shows the mass spectrum for leu-tyr-leu.
Figure 6:
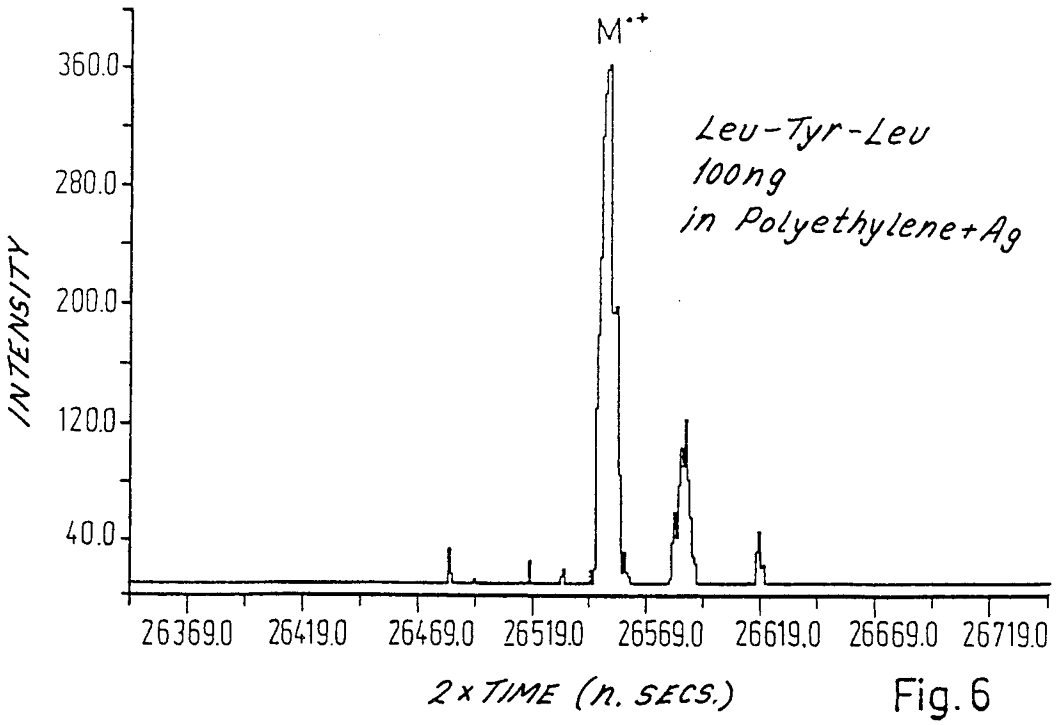
FIG. 6 shows the mass spectrum for the substance of FIG. 5 embedded in a polyethylene/silver matrix.

FIGS. 5 and 6 highlight the considerable increase in sensitivity that can be obtained by embedding the substance to be examined into a matrix consisting of polyethylene with an admixture of silver. 10 mg of powdery leu-tyr-leu, for example, led to a line of an intensity only little greater than the intensity of the line obtained from as little as 100 ng of leu-tyr-leu embedded in polyethylene with silver, i.e. a quantity smaller by $10^{-5}$. This is due to the fact that vaporization of the leu-tyr-leu embedded in the polyethylene matrix with an admixture of silver powder proceeds practically without any destruction of the molecules, while without the protective matrix the substance is destructed to a high degree by the bombarding effect of the laser beam.

Figure 7:
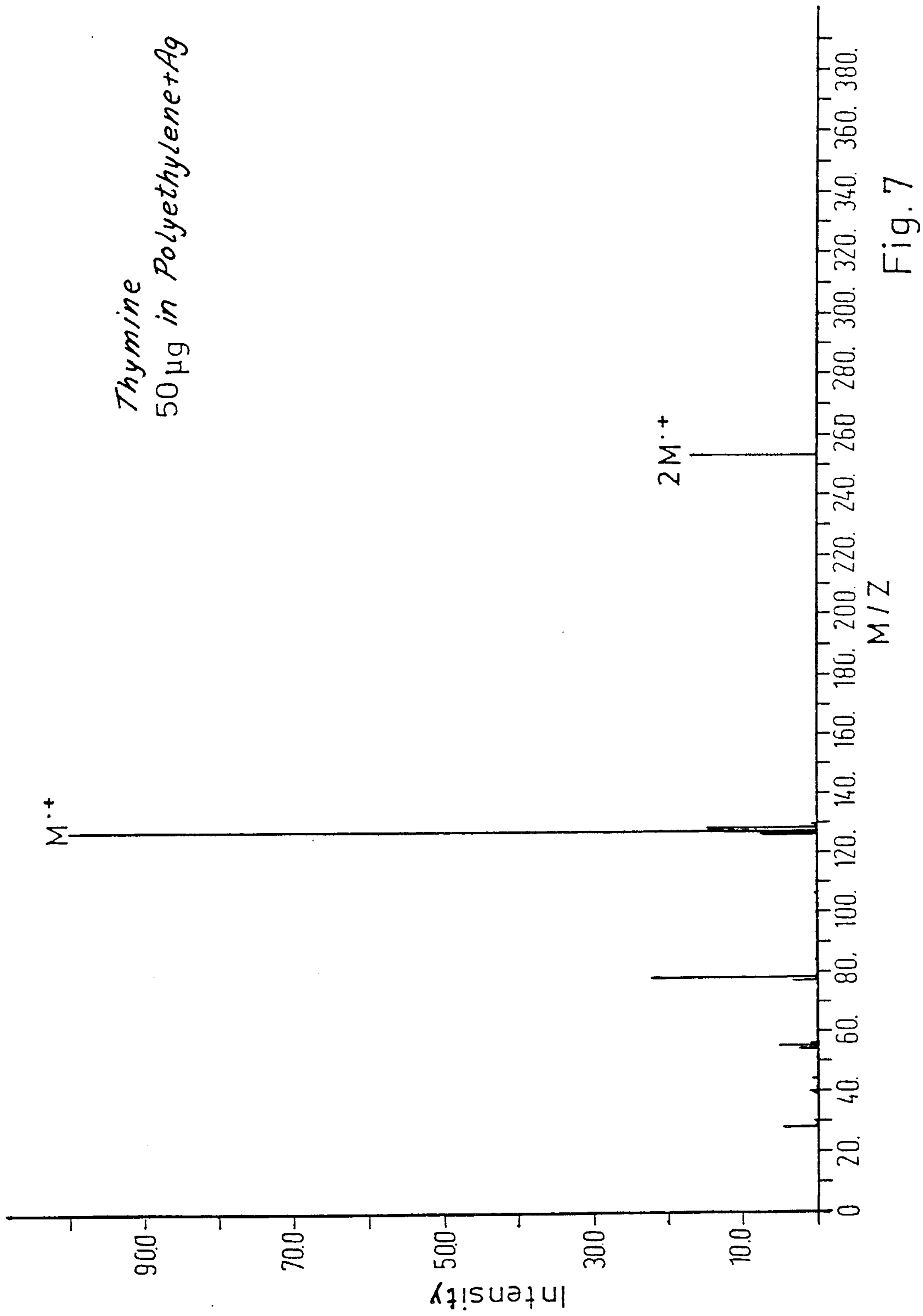
FIG. 7 shows the mass spectrum for thymine embedded in a polyethylene/silver matrix.
Figure 8:
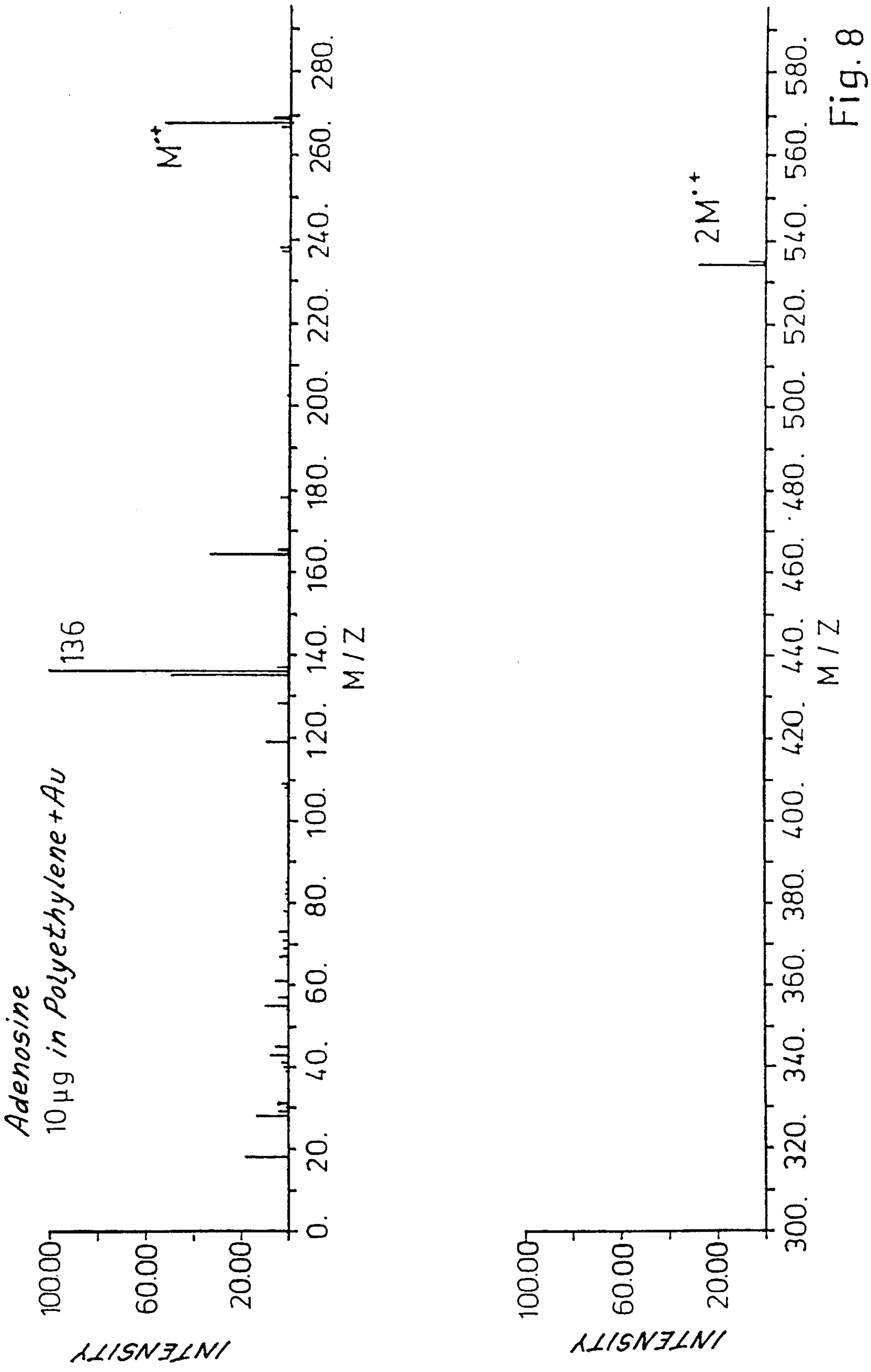
FIG. 8 shows the mass spectrum for adenosine embedded in a polyethylene matrix containing gold powder.
Figure 9:
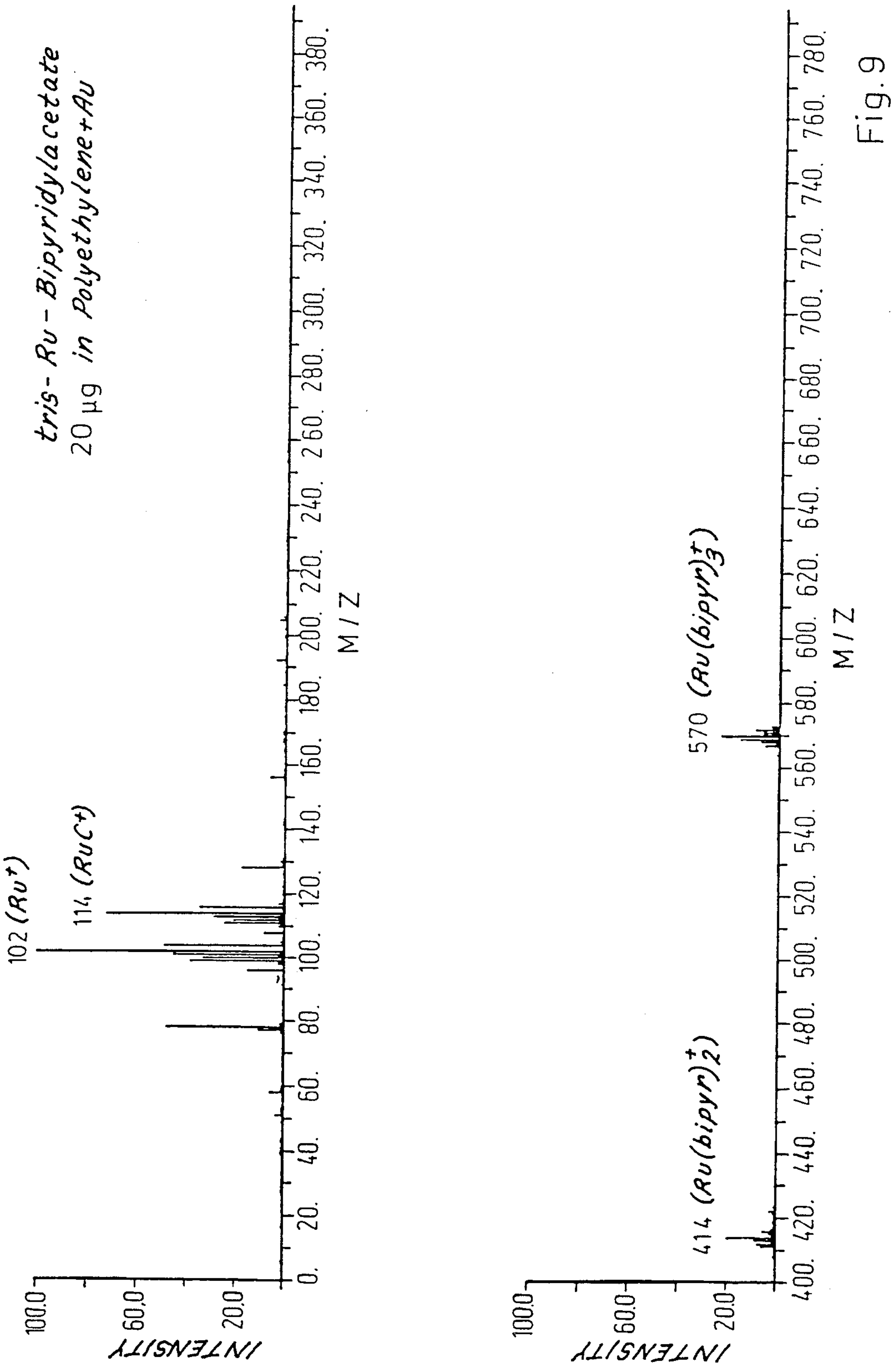
FIG. 9 shows the mass spectrum for tris-ru-bipyridyl acetate embedded in polyethylene matrix containing a gold powder.

FIGS. 7 to 9 show the spectra of substances from which no signal at all could be obtained heretofore, i.e. without embedding the substance in a matrix as provided by the invention. The spectrum of FIG. 7 shows the line of thymine which was obtained from only 50 μg of the substance, embedded in a matrix of polyethylene and silver. The spectrum of FIG. 8 was obtained from as little as 10 μg of adenosine, embedded in a matrix containing gold powder. FIG. 9 finally shows the spectrum of tris-ru-bipyridyl acetate. The quantity used was 20 μg, embedded in a matrix containing gold.

We claim:

1. Method of vaporizing a sample substance consisting of molecules, wherein the sample substance is exposed to high-energy laser beam pulses so that the molecules at the surface of the sample substance are desorbed by the energy of the laser beam pulses to produce neutral molecules, characterized by the steps of mixing the sample substance, prior to its irradiation, with a matrix material which is easily decomposed under the influence of the laser beam pulses so that the sample substance is embedded in the matrix material and exposing the mixture comprising the sample substance and the matrix material to the laser beam pulses.

2. Method according to claim 1, characterized in that the matrix material used is one consisting of at least one compound which is easily decomposed thermolytically into gas molecules.

3. Method according to claim 2, characterized in that the proportion of the sample substance in the mixture is 10 to 40 percent by weight of the total weight of the mixture.

4. Method according to claim 1, characterized in that the mixture employed is one where the number of molecules of the matrix material is greater than the number of molecules of the sample substance.

5. Method of vaporizing a sample substance consisting of molecules, wherein the sample substance is exposed to high-energy laser beam pulses so that the molecules at the surface of the sample substance are desorbed by the energy of the laser beam pulses to produce neutral molecules, characterized by the steps of mixing the sample substance, prior to mixing the sample substance, prior to its irradiation, with a matrix material which is easily decomposed under the influence of the laser beam pulses so that the sample substance is embedded in the matrix material, and exposing the mixture comprising the sample substance and the matrix material to the laser beam pulses and the matrix material used comprising at least one compound which absorbs light having the wavelength of the laser beam pulses.

6. Method according to claim 1, characterized in that the matrix material is a sugar compound.

7. Method according to claim 6, characterized in that the matrix material is a pentose compound.

8. Method according to claim 6, characterized in that the matrix material is a hexose compound.

9. Method according to claim 1, characterized in that the matrix material is a polysaccharide compound.

10. Method according to claim 9, characterized in that the matrix material is a cellulose compound.

11. Method according to claim 1, characterized in that the matrix material is nitrate of ammonium compound.

12. Method according to claim 1, characterized in that a metal powder having a grain size of less than 40 μm, is embedded into the matrix material.

13. Method according to claim 12, characterized in that the matrix material is a polyethylene compound.

14. Method according to claim 12, characterized in that the metal powder is gold powder.

15. Method according to claim 12, characterized in that the metal powder is silver powder.

16. Method according to claim 1, characterized in that pellets are first formed from the mixture of the matrix material and the sample substance, which pellets are then exposed to the laser beam pulses.

17. Method according to claim 1, characterized in that pellets are first formed from the mixture of the matrix material and the sample substance and a metal powder which pellets are then exposed to the laser beam pulses.

18. Method according to claim 17, characterized in that the pellets are formed from a spectroscopic polyethylene which is permeable to radiation of a wavelength of about 10 μm, said sample substance comprising approximately $10^{-1}$ to $10^{-2}$ parts by weight of the total weight of the mixture metal powder comprising approximately $10^{-1}$ to $10^{-2}$ parts by weight of the total weight metal of the mixture, and that the pellets are then exposed to the laser beam pulses of a $CO_2$ laser.

19. Method according to claim 18, characterized in that the metal powder is gold powder.

20. Method according to claim 18, characterized in that the metal powder is silver powder.

* * * * *

UNITED STATES PATENT AND TRADEMARK OFFICE
CERTIFICATE OF CORRECTION

PATENT NO. : 5,062,935

DATED : November 5, 1991

INVENTOR(S) : Edward E. Schlag et. al.

It is certified that error appears in the above-identified patent and that said Letters Patent is hereby corrected as shown below:

Column 5, line 66, insert --,-- after "material".

Column 6, lines 18-19, delete "prior to mixing the sample substance,".

Column 6, line 61, insert --and said-- before "metal".

Column 6, line 63, delete "metal".

Column 6, line 54, insert --,-- after "powder".

Signed and Sealed this

Third Day of January, 1995

Attest:

BRUCE LEHMAN

Attesting Officer

Commissioner of Patents and Trademarks